US010315367B2

(12) United States Patent
Camus et al.

(10) Patent No.: US 10,315,367 B2
(45) Date of Patent: Jun. 11, 2019

(54) SUPPORT TOOLING FOR WINDING A FIBER TEXTURE, A METHOD OF FABRICATING A FIBER TEXTURE, AND A METHOD OF FABRICATING A FIBER PREFORM FOR A BODY OF REVOLUTION

(71) Applicants: SAFRAN AIRCRAFT ENGINES, Paris (FR); SAFRAN, Paris (FR)

(72) Inventors: Erwan Camus, Portsmouth, NH (US); Dominique Marie Christian Coupe, Saint Frageau Ponthierry (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 303 days.

(21) Appl. No.: 15/258,152

(22) Filed: Sep. 7, 2016

(65) Prior Publication Data
US 2017/0066203 A1    Mar. 9, 2017

(30) Foreign Application Priority Data
Sep. 7, 2015 (FR) ...................................... 15 58254

(51) Int. Cl.
| B65H 75/28 | (2006.01) |
| B29C 70/54 | (2006.01) |
| B29C 70/32 | (2006.01) |
| B29B 11/16 | (2006.01) |
| B29K 105/08 | (2006.01) |

(52) U.S. Cl.
CPC ............ B29C 70/543 (2013.01); B29B 11/16 (2013.01); B29C 70/32 (2013.01); B65H 75/28 (2013.01); B29K 2105/089 (2013.01)

(58) Field of Classification Search
CPC .......... B65H 75/28; B29C 70/543; B25B 5/16
See application file for complete search history.

(56) References Cited

U.S. PATENT DOCUMENTS 4,804,294 A  *  2/1989  Barthel ..................... E02B 3/04
                                                                                   405/21

FOREIGN PATENT DOCUMENTS

| DE | 908 004 C | 4/1954 |
| DE | 36 12 079 A1 | 10/1986 |
| FR | 2 993 815 A1 | 1/2014 |
| WO | WO 2015/098761 A1 | 7/2015 |

OTHER PUBLICATIONS

Search Report as issued in French Patent Application No. 1558254, dated May 23, 2016.

* cited by examiner

*Primary Examiner* — Scott W Dodds
(74) *Attorney, Agent, or Firm* — Pillsbury Winthrop Shaw Pittman LLP

(57) ABSTRACT

A support tooling includes a mandrel presenting an outside surface onto which a fiber texture in the form of a strip is to be wound. The support tooling also has an extension including a flexible strip extending over a determined length between a first end fastened to the mandrel of the support tooling and a second end that is free and that has an attachment system suitable for holding the end of the fiber texture in the form of a strip for winding.

6 Claims, 5 Drawing Sheets

SUPPORT TOOLING FOR WINDING A FIBER TEXTURE, A METHOD OF FABRICATING A FIBER TEXTURE, AND A METHOD OF FABRICATING A FIBER PREFORM FOR A BODY OF REVOLUTION

CROSS REFERENCE TO RELATED APPLICATIONS

This application claims priority to French Patent Application No. 1558254, filed Sep. 7, 2015, the entire content of which is incorporated herein by reference in its entirety.

BACKGROUND OF THE INVENTION

The present invention relates to making composite material parts that are bodies of revolution, and more particularly to making and winding fiber textures that are to constitute the fiber reinforcement of such parts.

The field of application of the invention is more particularly making parts that are bodies of revolution out of structural composite material, i.e. structural parts comprising fiber reinforcement densified by a matrix. Composite materials enable parts to be made presenting overall weight that is smaller than the same parts would have if they were made out of metal.

For a part that constitutes a body of revolution, such as for example an aeroengine casing, the fiber preform that is to form the reinforcement of the part is made from a fiber texture that is wound on support tooling.

More precisely, and as shown in FIG. 1, a fiber texture 10 in the form of a strip is woven as a single piece by three-dimensional (3D) or multilayer weaving between a plurality of layers of warp yarns. The 3D or multilayer weaving of the fiber texture 10 is performed in a loom 20 of Jacquard type, with weaving consisting in inserting weft yarns 12 so as to create a pattern between warp yarns 11. At the outlet from the loom 20, the fiber texture 10 is wound on support tooling 30 comprising a mandrel 31 presenting an outside surface 31a onto which the fiber texture 10 is wound.

A fiber preform is then made by winding the fiber texture 10 under tension onto a mold tooling. As shown in FIG. 2, intermediate conveyor rollers 40 and 50 are used for making the tension uniform across the width of the fiber texture 10 while it is being wound under tension onto a mold tooling 60, the texture 10 being unwound from the support tooling 30. The mold tooling 60 comprises a mandrel 61 having an outside surface onto which the fiber texture 10 is wound under tension, said outside surface presenting a shape that corresponds to the shape of the composite material part that is to be made. The fiber texture 10 is held on the mandrel 61 of the mold tooling 60 by means of a shoe 62 that is removed between turns in order to be able to wind the following turn.

At the end of winding, i.e. after a plurality of turns of fiber texture 10 have been made on the mold tooling 60 so as to form a fiber preform 80, a shoe 62 is put into position once more in order to hold the preform 80 in place and prevent it from unwinding while it is being cut by a blade 70 as shown in FIG. 3.

Once the fiber preform 80 has been made in this way, injection sectors (not shown in FIG. 3) are put into position around the mold tooling 60 in order to impregnate the preform with a resin that is a precursor of the matrix.

Winding in that way presents drawbacks. Specifically, using intermediate conveyor rollers makes it necessary to provide an extra length of fiber texture, since the fiber texture needs to be held permanently under tension until the end of being wound on the mold tooling. As shown in FIG. 3, at the end of winding an extra length 15 of the fiber texture 10 is present between the support tooling 30 and the mold tooling 60 for the purpose of keeping the fiber texture 10 under tension. The extra length 15 is woven in continuity with the texture 10 that is used for making the preform 80. Since the beginning of weaving the fiber texture 10 corresponds to the end of winding, the extra length 15 is woven at the beginning of the fiber texture 10 and is fastened to the support tooling 30.

An extra length is thus associated with each fiber texture, and it is eliminated when the preform 60 is cut. The extra length 15 is then lost since it cannot be reused. This loss of material increases the cost of fabricating the preform and the cost of the resulting part made of composite material.

OBJECT AND SUMMARY OF THE INVENTION

It is therefore desirable to be able to have a way of making fiber preforms by winding that does not present the above-mentioned drawbacks.

For this purpose, the invention proposes support tooling comprising a mandrel presenting an outside surface onto which a fiber texture in the form of a strip is to be wound, the tooling further comprising an extension in the form of a flexible strip extending over a determined length between a first end fastened to the mandrel of the support tooling and a second end that is free and that includes an attachment system suitable for holding the end of a fiber texture in the form of a strip that is to be wound. The attachment system comprises two jaws connected together by a hinge in such a manner as to form a clamp that is movable between an open position in which the jaws are spaced apart from each other and a closed position in which the jaws are clamped relative to each other. The attachment system further comprises one or more intermediate clamping elements present between the two jaws. Each intermediate clamping element may present surfaces that are rough.

By means of the extension of the support tooling of the invention, the extra length of fiber texture that used to be required at the end of winding for maintaining the tension between the support tooling and the mold tooling and that was sacrificed when cutting the preform, is no longer required, since it is replaced by the extension. Also, the extension can be reused for making new fiber preforms.

In an aspect of the support tooling of the invention, the flexible strip of the extension is constituted by a strip of woven yarns made of a material selected from at least one of the following materials: poly(p-phenyleneterephthalamide) (PPD-T) better known under the name Kevlar®, intermediate modulus carbon, poly(imino-1,3-phenyleneiminocarbonyl-1,3-phenylenecarbonyl) better known under the name Nomex®, and glass. One of the jaws may also include spikes on its face facing the other jaw in order to improve retention of the fiber texture.

The invention also provides a method of making a fiber texture for reinforcing a part in the form of a body of revolution and made out of composite material, the method comprising using three-dimensional or multilayer weaving between a plurality of layers of yarns to form a strip of fiber texture as a single piece, and winding said texture onto support tooling comprising a mandrel having an outside surface onto which the fiber texture is wound, the support tooling also comprising an extension in the form of a flexible strip extending over a determined length between a first end fastened to the mandrel of the support tooling and a second end that is free and that has an attachment system for holding one end of the fiber texture in the form of a strip while it is being wound onto the support tooling. The attachment system comprises two jaws connected together by a hinge, with the end of the fiber texture being held between the two jaws while the fiber texture is being wound onto the support tooling. The attachment system further comprises one or more intermediate clamping elements present between the two jaws, and the end of the fiber texture comprises a distal portion in which at least some of the yarn layers are woven without interlinking with the other yarn layers of said texture, each layer woven without interlinking being held between a jaw and an intermediate clamping element or between two intermediate clamping elements of the attachment system.

The invention also provides a method of making a fiber preform in the form of a body of revolution, the method comprising making a fiber texture using the method of the invention for making a fiber texture, and the method of making a fiber preform in the form of a body of revolution comprising winding said fiber texture under tension onto the outside surface of a mandrel of mold tooling so as to obtain a fiber preform in the form of a body of revolution.

BRIEF DESCRIPTION OF THE DRAWINGS

Other characteristics and advantages of the invention appear from the following description of particular embodiments of the invention, given as nonlimiting examples, and with reference to the accompanying drawings, in which.

DETAILED DESCRIPTION OF EMBODIMENTS

The invention applies in general manner to making composite material parts in the form of bodies of revolution, such as aeroengine casings, e.g. such as fan casings, the parts being obtained by making fiber preforms in the form of bodies of revolution by winding and then densifying the preforms with a matrix. These parts such as aeroengine casings are of large dimensions, and in various ranges of such turbine engines for propelling airplanes, casings may have a diameter of the order of one meter up to three meters.

In accordance with the invention and as described below in detail, the present invention proposes using support tooling fitted with an extension enabling a fiber texture to be wound under tension while it is being shaped and without losing material.

The method of making a fiber texture of the invention begins by forming a fiber texture in the form of a strip that is subsequently wound onto a support tooling. In this example, the fiber texture is to form a fiber preform for an aeroengine casing.

The fiber texture is obtained by three-dimensional (3D) or multilayer weaving performed in known manner by means of a Jacquard type loom having a bundle of warp yarns or strands arranged in a plurality of layers, the warp yarns being interlinked by weft yarns. In the presently described example, the multilayer weaving is weaving with an "interlock" weave. The term "interlock" weave is used herein to mean a weave in which each layer of weft yarns interlinks a plurality of layers of warp yarns, with all of the yarns in a given weft column having the same movement in the weave plane. Other known types of multilayer weaving could be used, in particular such as those described in document WO 2006/136755, the content of which is incorporated herein by way of reference.

Particularly but not exclusively, the fiber texture of the invention is woven from yarns such as yarns of carbon fibers, of ceramic fibers such as silicon carbide fibers, or indeed of glass fibers.

Figure 4:
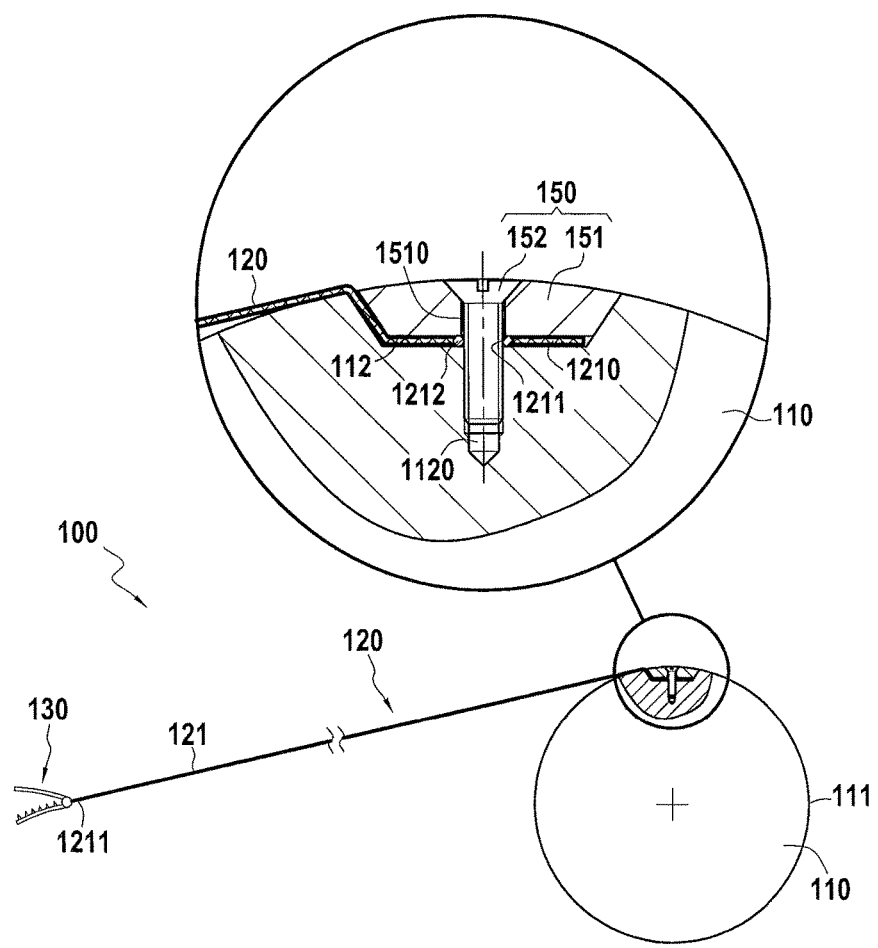
FIG. 4 is a diagrammatic side view showing support tooling in accordance with an embodiment of the invention.

FIG. 4 shows support tooling 100 in accordance with an embodiment of the invention that comprises a mandrel 110 presenting an outside surface 111 onto which a fiber texture in the form of a strip is to be wound. The support tooling 100 also has an extension 120 comprising a flexible strip 121 extending over a determined length between a first end 1210 fastened to the mandrel 110 of the support tooling and a second end 1220 that is free and that has an attachment system 130 suitable for holding the end of a fiber texture in the form of a strip for winding.

Figure 5:
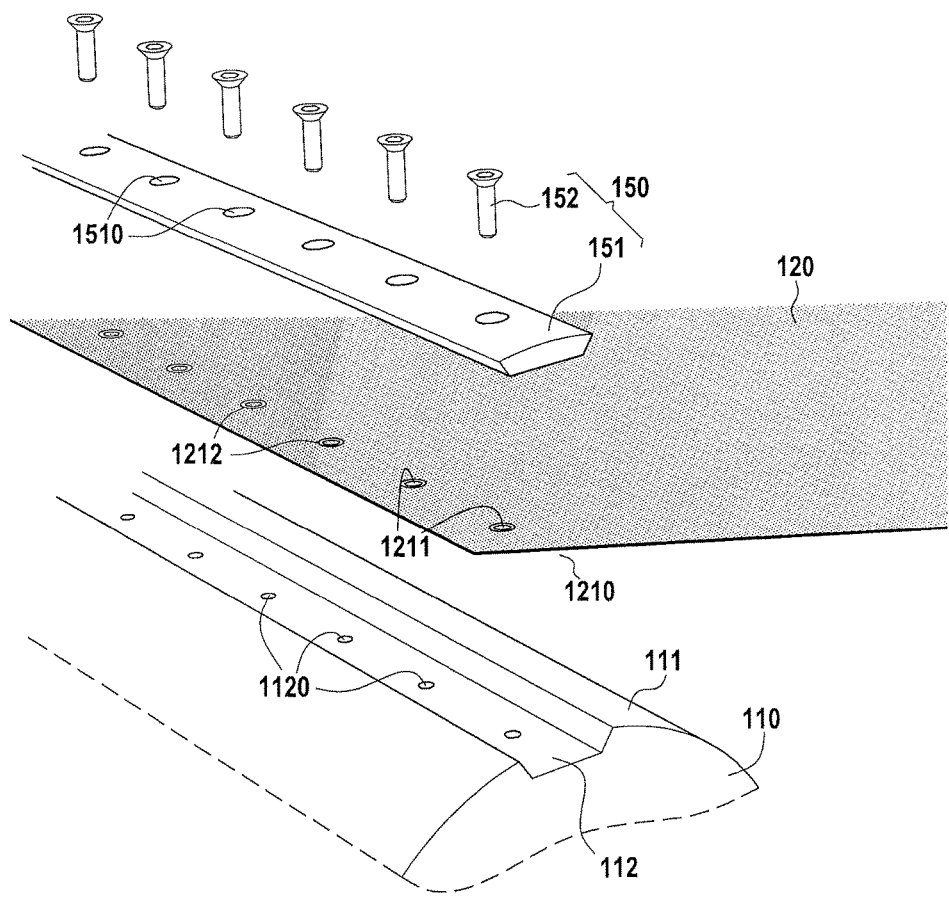
FIG. 5 is an exploded diagrammatic view in perspective showing an extension fastener device of the FIG. 4 support tooling.

The end of the flexible strip is fastened to the support tooling, preferably using a fastener system that does not give rise to any extra thickness in the surface of the mandrel of the support tooling. In the presently-described embodiment and as shown in FIG. 5, the mandrel 110 presents a recess 112 in its outside surface 111 suitable for receiving a fastener device 150 for fastening the first end 1210 of the flexible strip 121 and for incorporating it in the shape of the mandrel without extra thickness. In this example, the fastener device 150 is constituted by a fastener plate 151 presenting a shape that is complementary to the shape of the recess 112, together with screw fasteners 152, the plate 151 also including a plurality of orifices 1510 for passing the fasteners 152. The end 1210 of the flexible strip 121 has a plurality of orifices 1211 that are reinforced by eyelets 1212, the positions of the orifices 1011 coinciding with the positions of the orifices 1510 formed in the fastener plate 151. The end 1210 of the strip 121 of the extension 120 is held between the plate 151 and the bottom of the recess 112 by tightening the fasteners 152 in the orifices 1120, which orifices are provided with tapping that co-operates with the threads of the fasteners 152 (not shown in FIG. 5).

The person skilled in the art will have no difficulty in envisaging other embodiments of the device for fastening the end of the strip on the mandrel of the support tooling.

The strip 121 of the extension 120 may be made of any flexible material presenting a very small elongation percentage and withstanding the tension forces that are applied while the fiber texture is being wound on the mold tooling. By way of nonlimiting example, the strip 120 may be constituted by a strip obtained by weaving yarns made of any one of the following materials: poly(p-phenyleneterephthalamide) (PPD-T) better known under the name Kevlar®, intermediate modulus carbon, poly(imino-1,3-phenyleneiminocarbonyl-1,3-phenylenecarbonyl) better known under the name Nomex®, and glass.

Figure 6:
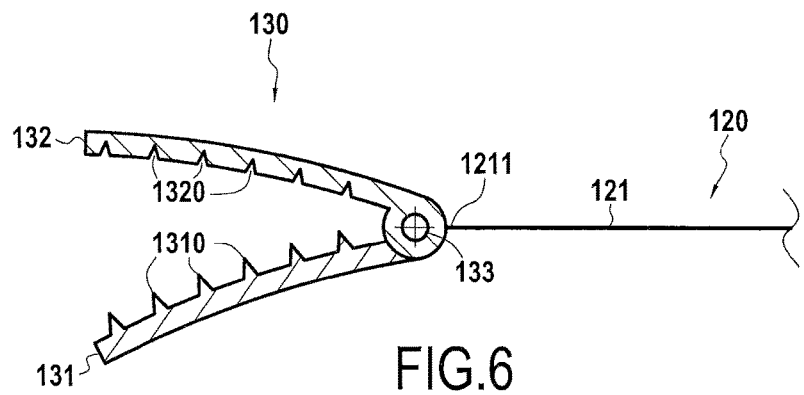
FIG. 6 is a diagrammatic side view showing an extension attachment system of the FIG. 4 support tooling.

In the presently-described embodiment and as shown in FIG. 6, the attachment system 130 comprises two jaws 131 and 132 that are connected together by a hinge 133 secured to the end 1211 of the strip 121. The jaws 131 and 132 thus form a clamp that is movable between an open position in which the jaws 131 and 132 are spaced apart from each other (FIG. 6) enabling an end of a fiber texture for holding to be inserted, and a closed position (FIG. 7) in which the jaws 131 and 132 are clamped against each other, e.g. by means of screws (not shown in FIG. 7) so as to hold captive and retain the end of the fiber texture that is to be wound.

In order to prevent the texture sliding between the two jaws 131 and 132, one of the two jaws, in this example the jaw 131, may be provided with spikes 1310, while the other jaw, in this example the jaw 132, may include recesses 1320 receiving the tips of the spikes 1310 when the two jaws are clamped together. If the jaws 131 and 132 are of large dimensions, they are preferably curved in shape with curvature corresponding to the curvature of the mandrel of the support tooling, as shown in FIG. 6.

There follows a description of a method of making a fiber preform in the form of a body of revolution by winding a fiber texture under tension onto mold tooling.

Figure 1:
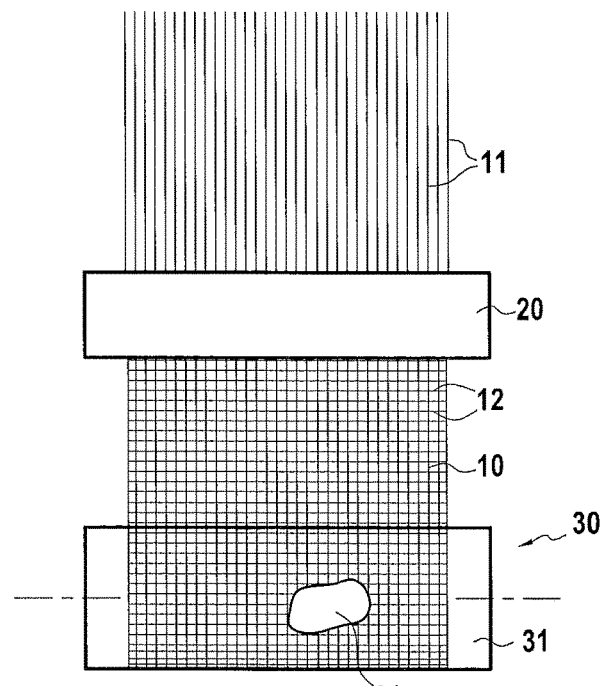
FIG. 1 is a diagrammatic view showing a prior art fiber texture in the form of a strip being woven and stored on support tooling.
Figure 2:
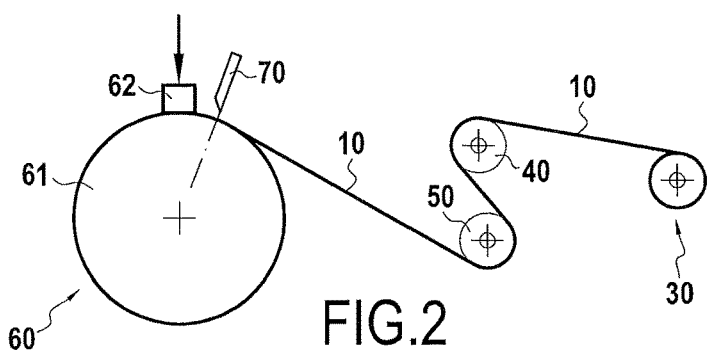
FIGS. 2 and 3 are diagrammatic side views showing the formation of a fiber preform in the form of a body of revolution by winding the FIG. 1 fiber texture under tension.
Figure 3:
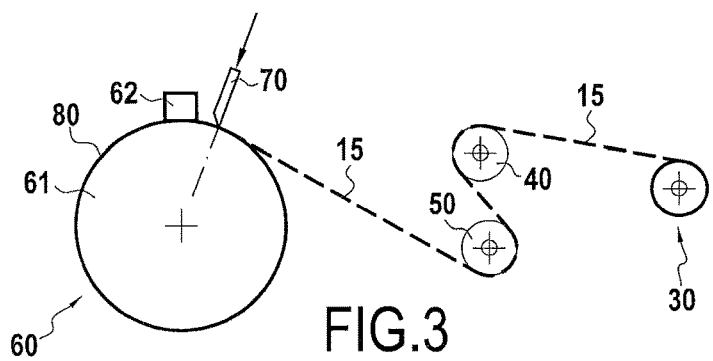
Figure 7:
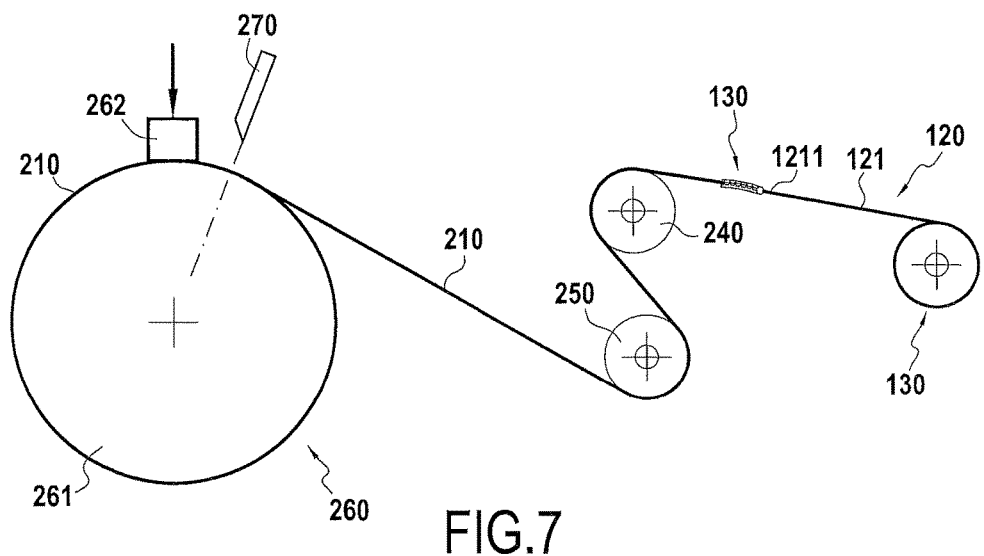
FIGS. 7 and 8 are diagrammatic side views showing the formation of a fiber preform in the form of a body of revolution by taking a fiber texture previously wound on the FIG. 4 support tooling, and winding the fiber texture under tension.
Figure 8:
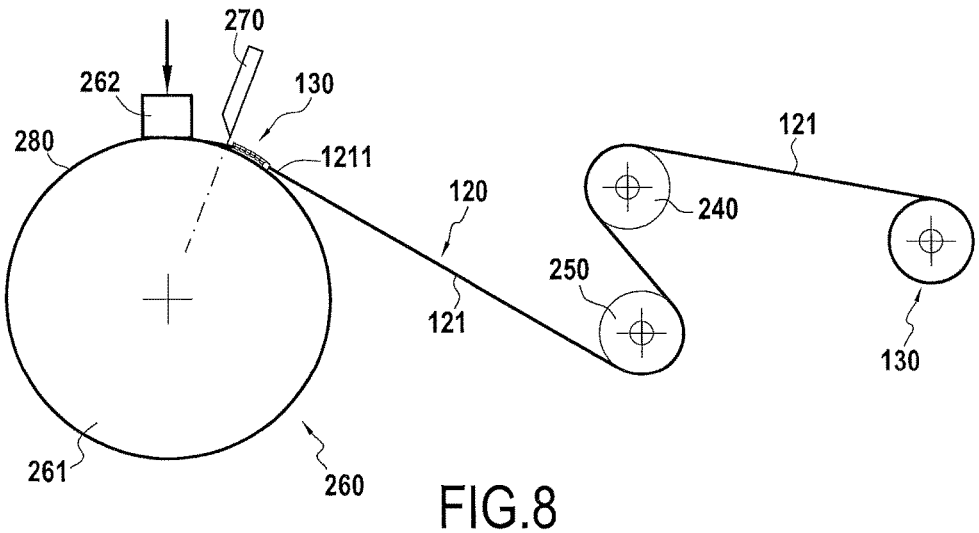

FIGS. 7 and 8 show a fiber preform 280 being made from a fiber texture 210 woven using 3D or multilayer weaving. As described above with reference to FIGS. 2 and 3, the fiber preform is made by winding the fiber texture 210 under tension onto mold tooling 260, with intermediate conveyor rollers 240 and 250 being used to make the tension uniform over the width of the fiber texture while it is being wound under tension onto the mold tooling 260, the fiber texture being unwound from the support tooling 100 (FIG. 7). The mold tooling 260 comprises a mandrel 261 onto the outside surface of which the fiber texture is wound under tension, said outside surface presenting a shape that corresponds to the shape of the composite material part that is to be made. At the end of winding, and as shown in FIG. 8, i.e. after a plurality of turns of fiber texture have been laid on the mold tooling 260 so as to form a fiber preform 280, a shoe 262 is put into position in order to hold the preform 280 in place and prevent it from unwinding while it is being cut by a blade 270

The cut is made immediately in front of the free ends of the jaws 131 and 132 of the system 130 for attaching the extension 120, thus making it possible to avoid having losses of material in the fiber structure 210 used for making the preform 280. Specifically, the extra length of fiber texture that used to be required at the end of winding for maintaining tension between the support tooling, and the mold tooling and that was sacrificed when cutting the preform, is replaced in this example by the extension 120. Also, the extension 120 can be reused for making new fiber preforms.

Figure 9:
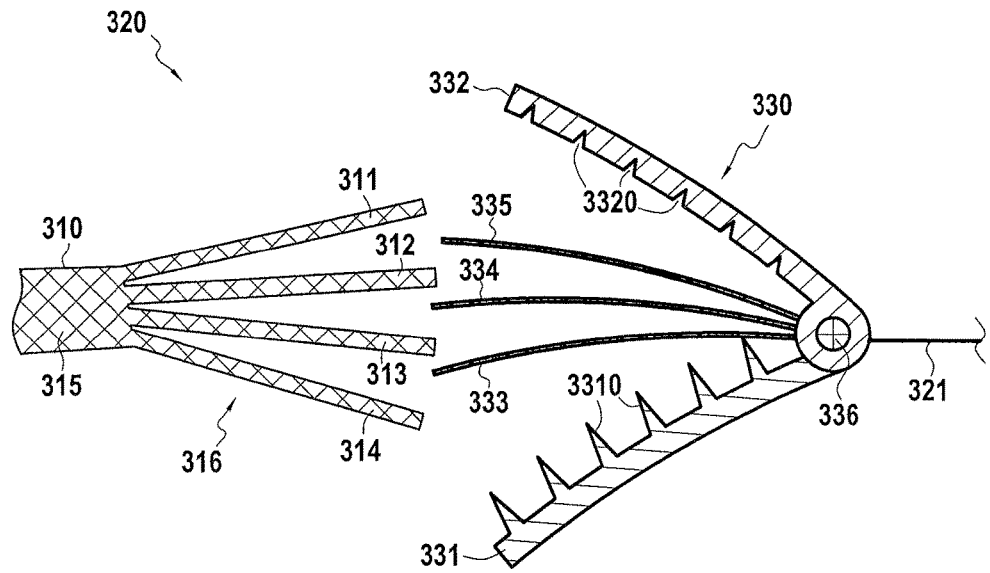
FIGS. 9 and 11 are diagrammatic side views showing a variant embodiment of the extension attachment system of the support tooling of the invention.

FIG. 9 shows a variant embodiment of the extension attachment system of the invention. In FIG. 9, an extension 320 has an attachment system 330 that differs from the above-described attachment system 130 in that in addition to the two jaws 331 and 332 it further includes intermediate clamping elements 333, 334, and 335 that are present between the jaws 331 and 332. The jaws 331 and 332, and also the intermediate clamping elements 333, 334, and 335 are connected together by a hinge 336 that is secured to the end 3211 of the strip 321. The remainder of the extension 320 is identical to the above-described extension 120.

Figure 10:
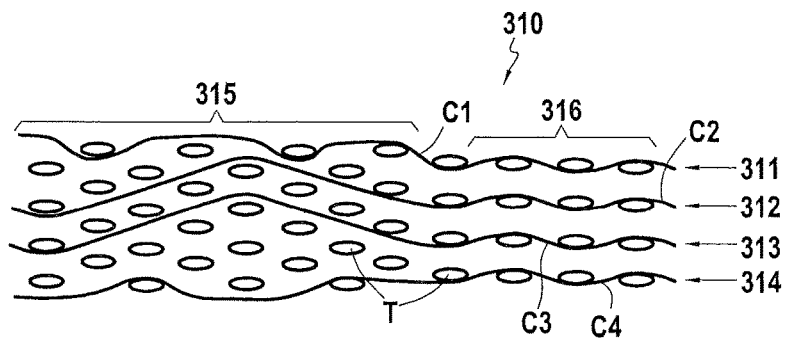
FIG. 10 is a diagrammatic view showing a fiber texture with a weave that is modified at its end for engaging the attachment system of FIGS. 9 and 11.

The use of intermediate clamping elements in the attachment system 330 improves retention of a fiber texture and limits relative sliding between the warp strands or yarns by holding independent portions or plies of the texture captive between a jaw and an intermediate clamping element or between two intermediate clamping elements of the attachment system. For this purpose, and as shown in FIG. 10, a fiber texture 310, woven using four layers of warp yarns C1, C2, C3 and C4 together with weft yarns T, includes, at its end that is to be held by the attachment system 330, a portion 316 in which each of the four layers of warp yarns C1 to C4 is woven with a two-dimensional (2D) weave, e.g. such as a plain weave or a satin weave, so as to form four independent plies or layers 311, 312, 313, and 314, i.e. plies or layers that are not interlinked by the weft yarns T. The remainder of the fiber texture 310 is constituted by a portion 315 that is woven with a three-dimensional or multilayer weave in which at least some of the weft yarns T interlink the layers of warp yarns.

Figure 11:
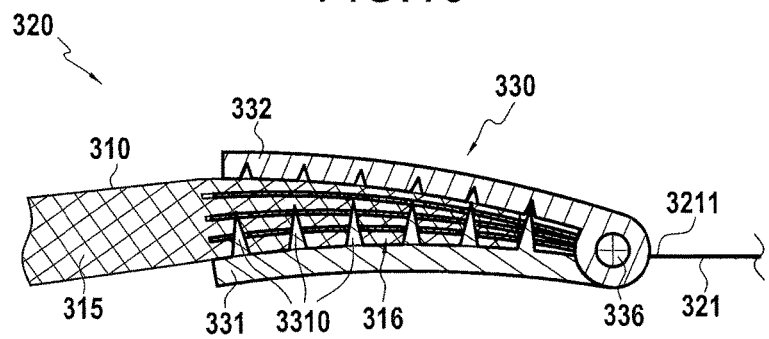

As shown in FIGS. 9 and 11, the plies 311, 312, 313, and 314 are placed respectively between the jaw 332 and the intermediate clamping element 335, between the intermediate clamping elements 335 and 334, between the intermediate clamping elements 334 and 333, and between the intermediate clamping element 333 and the jaw 331. In this example, the intermediate clamping elements 333, 334, and 335 include perforations for passing spikes 3310. Also, the intermediate clamping elements 333, 334, and 335 preferably present surfaces that are rough, thereby increasing the force with which the plies are held.

The invention claimed is:

1. Support tooling comprising a mandrel presenting an outside surface onto which a fiber texture in the form of a strip is to be wound, the support tooling further comprising an extension in the form of a flexible strip extending over a determined length between a first end fastened to the mandrel of the support tooling and a second end that is free and that includes an attachment system suitable for holding the end of the fiber texture in the form of a strip that is to be wound, the attachment system comprising two jaws connected together by a hinge in such a manner as to form a clamp that is movable between an open position in which the jaws are spaced apart from each other and a closed position in which the jaws are clamped relative to each other, wherein the attachment system further comprises one or more intermediate clamping elements present between the two jaws, and wherein the one or more intermediate clamping elements define spaces between the jaws and the one or more intermediate clamping elements.

2. Support tooling according to claim 1, wherein the flexible strip of the extension is constituted by a strip of woven yarns made of a material selected from at least one of the following materials: poly(p-phenyleneterephthalamide) (PPD-T), intermediate modulus carbon, poly(imino-1,3-phenyleneiminocarbonyl-1,3-phenylenecarbonyl), and glass.

3. Support tooling according to claim 1, wherein one of the jaws includes spikes on its face facing the other jaw.

4. Support tooling according to claim 1, wherein each intermediate clamping element has surfaces that are rough.

5. A method of making a fiber texture for reinforcing a part in the form of a body of revolution and made out of composite material, the method comprising using three-dimensional or multilayer weaving between a plurality of layers of yarns to form a strip of fiber texture as a single piece, and winding said fiber texture onto support tooling comprising a mandrel having an outside surface onto which the fiber texture is wound, the support tooling also comprising an extension in the form of a flexible strip extending over a determined length between a first end fastened to the mandrel of the support tooling and a second end that is free and that has an attachment system for holding one end of the fiber texture in the form of a strip while it is being wound onto the support tooling, the attachment system comprising two jaws connected together by a hinge in such a manner as to form a clamp that is movable between an open position in which the jaws are spaced apart from each other and a closed position in which the jaws are clamped relative to each other, the end of the fiber texture being held between the two jaws while the fiber texture is being wound onto the support tooling, wherein the attachment system further comprises one or more intermediate clamping elements present between the two jaws, wherein the one or more intermediate clamping elements define spaces between the jaws and the one or more intermediate clamping elements, and wherein the end of the fiber texture comprises a distal portion in which at least some of the yarn layers are woven without interlinking with the other yarn layers of said texture, each layer woven without interlinking being held between one of the two jaws and one of the one or more of the intermediate clamping elements or between two intermediate clamping elements of the attachment system.

6. A method of making a fiber preform in the form of a body of revolution, the method comprising winding a fiber texture under tension onto an outside surface of a first mandrel of mold tooling so as to obtain a fiber preform in the form of the body of revolution, wherein prior to winding the fiber texture onto the first mandrel, winding the fiber texture on a support tooling comprising a second mandrel presenting an outside surface onto which the fiber texture in the form of a strip is wound, the support tooling further comprising an extension in the form of a flexible strip extending over a determined length between a first end fastened to the second mandrel of the support tooling and a second end that is free and that includes an attachment system suitable for holding the end of the fiber texture, the attachment system comprising two jaws connected together by a hinge in such a manner as to form a clamp that is movable between an open position in which the jaws are spaced apart from each other and a closed position in which the jaws are clamped relative to each other, wherein the attachment system further comprises one or more intermediate clamping elements present between the two jaws, and wherein the one or more intermediate clamping elements define spaces between the jaws and the one or more intermediate clamping elements.

* * * * *